United States Patent [19]
Muto

[11] Patent Number: 5,359,628
[45] Date of Patent: Oct. 25, 1994

[54] CHANNEL IMPULSE RESPONSE ESTIMATOR FOR USE IN AN ADAPTIVE MAXIMUM LIKELIHOOD SEQUENCE ESTIMATION RECEIVER WHICH IS APPLICABLE TO A COMMUNICATION SYSTEM HAVING A CHANNEL CHARACTERISTIC WITH RAPID FLUCTUATION

[75] Inventor: Hiroyasu Muto, Tokyo, Japan
[73] Assignee: NEC Corporation, Tokyo, Japan
[21] Appl. No.: 933,790
[22] Filed: Aug. 24, 1992
[30] Foreign Application Priority Data Aug. 30, 1991 [JP] Japan .................... 3-220360

[51] Int. Cl.$^5$ .................................. H03D 1/00
[52] U.S. Cl. ........................ 375/94; 375/13; 375/14; 364/724.2; 333/28 R
[58] Field of Search ............. 375/14, 94, 99, 101, 375/13; 370/43; 364/724.2, 724.19; 333/28 R, 18

[56] References Cited

U.S. PATENT DOCUMENTS

| | | | |
|---|---|---|---|
| 4,613,975 | 9/1986 | Aoyagi et al. | 375/102 |
| 5,164,962 | 11/1992 | Nakai et al. | 375/101 |
| 5,175,747 | 12/1992 | Murakami | 375/14 |
| 5,231,648 | 7/1993 | Driedger et al. | 375/14 |

FOREIGN PATENT DOCUMENTS 0412616 2/1991 European Pat. Off. .

OTHER PUBLICATIONS

*Digital Communications*, edited by Proakis, John G., New York, McGraw-Hill, 1983, pp. 410–412.

Primary Examiner—Stephen Chin
Assistant Examiner—Amanda T. Le
Attorney, Agent, or Firm—Sughrue, Mion, Zinn, Macpeak & Seas

[57] ABSTRACT

In a channel impulse response estimator (12), a local preamble generator (35) generates a local preamble signal identical with a transmission preamble signal in a received signal. A preamble detector (37) detects the transmission preamble signal in an estimated sequence signal to produce a preamble detection signal. Responsive to the preamble detection signal, a sequence selector (39) selects one of the local preamble signal and the estimated sequence signal as a selected sequence signal which is supplied to a re-modulator (14). Responsive to the preamble detection signal, a step-size generator (41) generates one of first and second step-size signals as a selected step-size signal which is supplied to a tap coefficient producer (26).

4 Claims, 4 Drawing Sheets

CHANNEL IMPULSE RESPONSE ESTIMATOR FOR USE IN AN ADAPTIVE MAXIMUM LIKELIHOOD SEQUENCE ESTIMATION RECEIVER WHICH IS APPLICABLE TO A COMMUNICATION SYSTEM HAVING A CHANNEL CHARACTERISTIC WITH RAPID FLUCTUATION

BACKGROUND OF THE INVENTION

This invention relates to a channel impulse response estimator for use in an adaptive maximum likelihood sequence estimation receiver and, more particularly, to a channel impulse response estimator for use in an adaptive equalizer system for a digital mobile communication system.

In general, an adaptive maximum likelihood sequence estimation receiver of the type described is supplied with a received signal which is transmitted through a transmission path or a channel. The received signal has a waveform subject to a distortion which results from degradation of a channel characteristic or a characteristic in the transmission path and interruption in the transmission path. The adaptive maximum likelihood sequence estimation receiver serves to equalize the distortion of the waveform, as well known in the art.

An adaptive maximum likelihood sequence estimation receiver is disclosed in a book "Digital Communications" edited by Proakis, John G, New York, McGraw-Hill, 1983. The adaptive maximum likelihood sequence estimation receiver comprises a maximum likelihood sequence estimator and a channel impulse response estimator. The maximum likelihood sequence estimator carries out a sequence estimation operation on the received signal in response to a plurality of impulse response signals which collectively indicate a channel impulse response to produce an estimated sequence signal indicative of an estimated sequence after a lapse of a predetermined delay time. The received signal comprises a transmission preamble signal indicative of a transmission preamble and a data signal following the transmission preamble signal. The channel impulse response estimator carries out a response estimation operation on the received signal and the estimated sequence signal to produce the impulse response signals. In the manner which will later become clear, a conventional channel impulse response estimator includes a tap coefficient producer for producing a plurality of tap coefficient signals indicative of tap coefficients on the basis of a fixed step-size signal indicative of a fixed step size. As a result, the adaptive maximum likelihood sequence estimation receiver including the conventional channel impulse response estimator is disadvantageous in that it is difficult to apply to a communication system such as a digital mobile communication system having the channel characteristic which rapidly fluctuates.

SUMMARY OF THE INVENTION

It is an object of this invention to provide a channel impulse response estimator for use in an adaptive maximum likelihood sequence estimation receiver which is capable of applying to a communication system having a channel characteristic which rapidly fluctuates.

Other objects of this invention will become clear as the description proceeds.

On describing the gist of an aspect of this invention, it is possible to understand that a channel impulse response estimator is for use in an adaptive maximum likelihood sequence estimation receiver comprising a maximum likelihood sequence estimator for carrying out a sequence estimation operation on a received signal in response to a plurality of impulse response signals which collectively indicate a channel impulse response to produce an estimated sequence signal indicative of an estimated sequence after a lapse of a predetermined delay time. The received signal comprises a transmission preamble signal indicative of a transmission preamble and a data signal following the transmission preamble signal. The channel impulse response estimator carries out a response estimation operation on the received signal and the estimated sequence signal to produce the impulse response signals.

According to this invention, the above-understood channel impulse response estimator comprises a local preamble generator for generating a local preamble signal indicative of a local preamble which is identical with the transmission preamble. Connected to the maximum likelihood sequence estimator, a preamble detector detects the transmission preamble signal in the estimated sequence signal to produce a preamble detection signal on detection of the transmission preamble signal. Connected to the maximum likelihood sequence estimator, the local preamble generator, and the preamble detector, a sequence selector selects, in response to the preamble detection signal, one of the local preamble signal and the estimated sequence signal as a selected sequence signal. The sequence selector selects the local preamble signal as the selected sequence signal on presence of the preamble detection signal. The sequence selector selects the estimated sequence signal as the selected sequence signal on absence of the preamble detection signal. Connected to the preamble detector, a step-size generator generates, in response to the preamble detection signal, one of first and second step-size signals as a selected step-size signal. The first step-size signal indicates a first step size larger than a second step size indicated by the second step-size signal. The step-size generator generates the first step-size signal as the selected step-size signal on presence of the preamble detection signal. The step-size generator generates the second step-size signal as the selected step-size signal on absence of the preamble detection signal. Connected to the sequence selector, a re-modulator carries out a re-modulation operation on the selected sequence signal on the basis of a plurality of tap coefficients to produce a replica signal indicative of a replica of the received signal and a plurality of delayed sequence signals into which the selected sequence signal is delayed. Supplied with the received signal, a delay circuit delays the received signal for the predetermined delay time to produce a delayed received signal. Connected to the delay circuit and the re-modulator, a difference calculating circuit calculates a difference between the delayed received signal and the replica signal to produce a difference signal indicative of the difference. Connected to the difference calculating circuit, the step-size generator, and the re-modulator, a tap coefficient producer produces a plurality of tap coefficient signals indicative of the tap coefficients on the basis of the difference signal, the selected step-size signal, and the delayed sequence signals. Connected to the tap coefficient producer and the maximum likelihood sequence estimator, supplying means supplies the tap coefficient signals as the impulse response signals to the maximum likelihood sequence estimator.

In the above-mentioned channel impulse response estimator, the re-modulator may preferably comprise a shift register connected to the sequence selector for carrying out a shifting operation on the selected sequence signal to produce a plurality of shifted sequence signals as the delayed sequence signals, a multiplying circuit connected to the shift register and the tap coefficient producer for multiplying the shifted sequence signals by the tap coefficient signals to produce a plurality of multiplied signals, and a summing circuit connected to the multiplying circuit for summing up the multiplied signals to produce a summed signal as the replica signal.

DESCRIPTION OF THE PREFERRED EMBODIMENT

Figure 1:
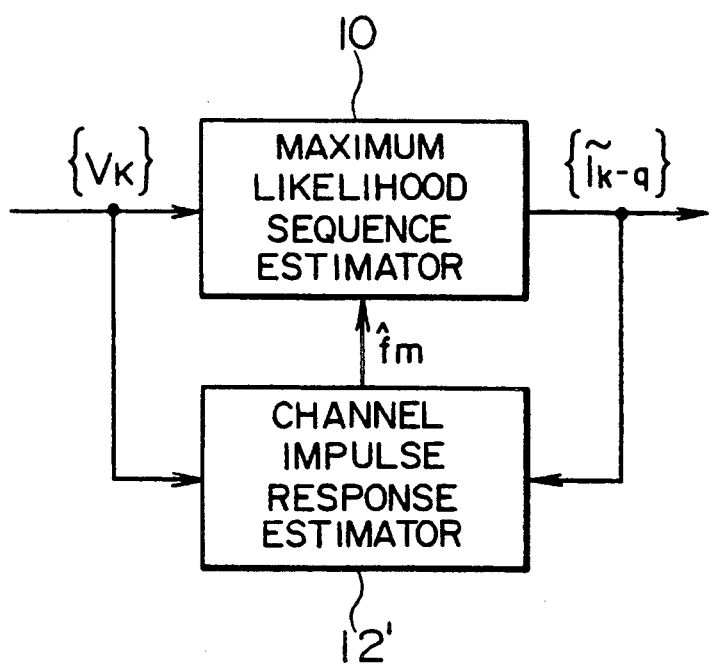
FIG. 1 shows a block diagram of an adaptive maximum likelihood sequence estimation receiver to which this invention is applicable.

Referring to FIG. 1, an adaptive maximum likelihood sequence estimation receiver will be described at first for a better understanding of this invention. The adaptive maximum likelihood sequence estimation receiver is supplied with a received signal $\{V_k\}$ which is transmitted through a transmission path or a channel. The received signal $\{V_k\}$ has a waveform subject to a distortion which results from degradation of a channel characteristic or a characteristic in the transmission path and interruption in the transmission path. The adaptive maximum likelihood sequence estimation receiver serves to equalize the distortion of the waveform.

The adaptive maximum likelihood sequence estimation receiver comprises a maximum likelihood sequence estimator 10 and a channel impulse response estimator 12'. The maximum likelihood sequence estimator 10 carries out a sequence estimation operation on the received signal $\{V_k\}$ in response to zeroth through M-th impulse response signals $f_0, f_1, \ldots, f_{M-2}, f_{M-1}$, and $f_M$ which collectively indicate a channel impulse response to produce an estimated sequence signal $\{I_{k-q}\}$ indicative of an estimated sequence after a lapse of a predetermined delay time, where M represents a predetermined positive integer. The received signal $\{V_k\}$ comprises a transmission preamble signal indicative of a transmission preamble and a data signal following the transmission preamble signal. The channel impulse response estimator 12' carries out a response estimation operation on the received signal $\{V_k\}$ and the estimated sequence signal $\{I_{k-q}\}$ to produce the zeroth through the M-th impulse response signals $f_0$ to $f_M$.

Figure 2:
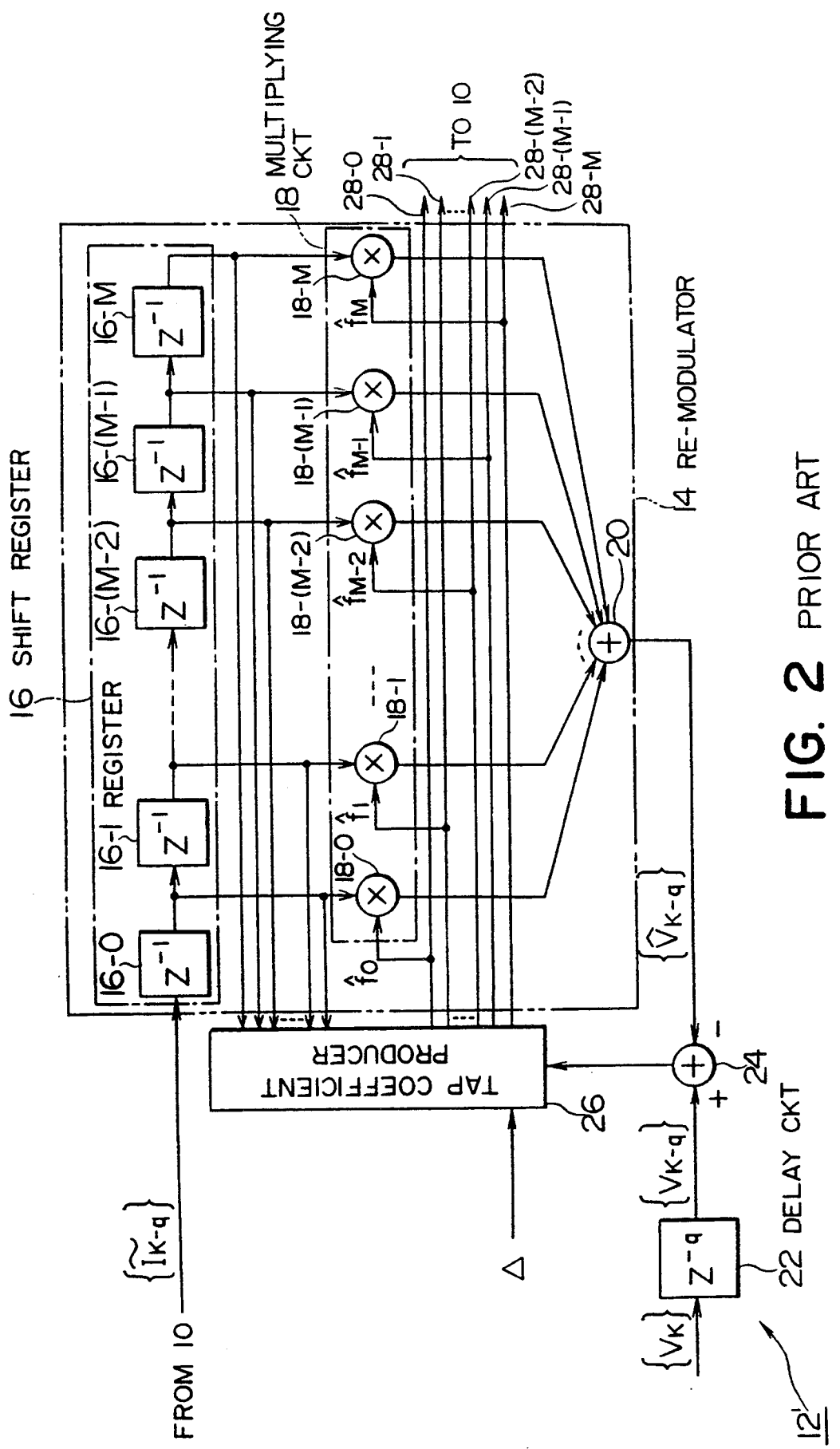
FIG. 2 shows a block diagram of a conventional channel impulse response estimator.

Turning to FIG. 2, a conventional channel impulse response estimator 12' will be described for a better understanding of this invention. The illustrated channel impulse response estimator 12' comprises a re-modulator 14 supplies with the estimated sequence signal $\{I_{k-q}\}$ from the maximum likelihood sequence estimator 10 (FIG. 1). The re-modulator 14 carries out a re-modulation operation on the estimated sequence signal $\{I_{k-q}\}$ on the basis of zeroth through M-th tap coefficients to produce a replica signal $\{V_{k-q}\}$ indicative of a replica of the received signal $\{V_k\}$ and zeroth through M-th delayed sequence signals $\{I_{k-(q+1)}\}$ to $\{I_{k-(q+M+1)}\}$ into which the estimated sequence signal $\{I_{k-q}\}$ is delayed.

More specifically, the re-modulator 14 comprise a shift register 16 supplied with the estimated sequence signal $\{I_{K-q}\}$. The shift register 16 carries out a shifting operation on the estimated sequence signal $\{I_{k-q}\}$ to produce zeroth through M-th shifted sequence signals as the zeroth through the M-th delayed sequence signals $\{I_{k-(q+1)}\}$ to $\{I_{k-(q+M+1)}\}$, respectively. The shift register 16 comprises zeroth through M-th registers 16-0, 16-1, ..., 16-(M−2), 16-(M−1), and 16-M which are connected in series. The zeroth through the M-th registers 16-0 to 16-M produce the zeroth through the M-th shifted sequence signals $\{I_{k-(q+1)}\}$ to $\{I_{k-(q+M+1)}\}$, respectively.

The zeroth through the M-th shifted sequence signals $\{I_{k-(q+1)}\}$ to $\{I_{k-(q+M+1)}\}$ are supplied to a multiplying circuit 18. The multiplying circuit 18 is also supplied with zeroth through M-th tap coefficient signals $f_0, f_1, \ldots, f_{M-2}, f_{M-1}$ and $f_M$ which will become clear as the description proceeds. The multiplying circuit 18 multiplies the zeroth through the M-th shifted sequence signals $\{I_{k-(q+1)}\}$ to $\{I_{k-(q+M+1)}\}$ by the zeroth through the M-th tap coefficient signals $f_0$ to $f_M$ to produce zeroth through M-th multiplied signals. The multiplying circuit 18 comprises zeroth through M-th multipliers 18-0, 18-1, ..., 18-(M−2), 18-(M−1), and 18-M. The zeroth multiplier 18-0 multiplies the zeroth shifted sequence signal $\{I_{k-(1+1)}\}$ by the zeroth tap coefficient signal $f_0$ to produce the zeroth multiplied signal. Similarly, a first multiplier 18-1 multiplies the first shifted sequence signal $\{I_{k-(q+2)}\}$ by the first tap coefficient signal $f_1$ to produce the first multiplied signal. In general, an m-th multiplier 18-m multiplies an m-th shifted sequence signal $\{I_{k-(q+m+1)}\}$ by an m-th tap coefficient signal $f_m$ to produce an m-th multiplied signal, where m represents a variable between zero and the predetermined positive integer M, both inclusive.

The zeroth through the M-th multiplied signals are supplied to a summing circuit 20 connected to the multiplying circuit 18. The summing circuit 20 sums up the zeroth through the M-th multiplied signals to produce a summed signal as the replica signal $\{V_{k-q}\}$.

The channel impulse response estimator 12' further comprises a delay circuit 22 supplied with the received signal $\{V_k\}$. The delay circuit 22 delays the received signal $\{V_k\}$ for the predetermined delay time to produce a delayed received signal $\{V_{k-q}\}$. The delay circuit 22 is connected to a subtracter 24. The subtracter 24 is also connected to the re-modulator 14. The subtracter 24 subtracts the replica signal $\{V_{k-q}\}$ from the delayed received signal $\{V_{k-q}\}$. That is the subtracter 24 acts as a difference calculating circuit for calculating a difference between the delayed received signal $\{V_{k-q}\}$ and the replica signal $\{V_{k-q}\}$ to produce a difference signal indicative of the difference.

The difference signal is supplied to a tap coefficient producer 26. The tap coefficient producer 26 is connected to the re-modulator 14 and is supplied with a fixed step-size signal indicative of a fixed step size Δ. The tap coefficient producer 26 produces the zeroth through the M-th tap coefficient signals $f_0$ to $f_M$ indicative of the zeroth through the M-th tap coefficients on the basis of the difference signal, the fixed step-size signal, and the zeroth through the M-th delayed sequence signals $\{I_{k-(q+1)}\}$ to $\{I_{k-(q+M+1)}\}$. In other words, the tap coefficient producer 26 produces the zeroth through the M-th tap coefficient signals $f_0$ to $f_M$ so as to minimize power of the difference signal, namely, by the use of a minimum square error (MSE) algorithm. The tap coefficient producer 26 is connected to the maximum likelihood sequence estimator 10 (Fig.1) through zeroth through M-th signal lines 28-0, 28-1, ..., 28-(M−2), 28-(M−1), and 28-M. The zeroth through the M-th tap coefficient signals $f_0$ to $f_M$ are supplied via the zeroth through the M-th signal lines 28-0 to 28-M as the zeroth through the M-th impulse response signals to the maximum likelihood sequence estimator 10, respectively. That is, a combination of the zeroth through the M-th signal lines 28-0 to 28-M serves as a supplying arrangement for supplying the zeroth through the M-th tap coefficient signals $f_0$ to $f_M$ as the zeroth through the M-th impulse response signals to the maximum likelihood sequence estimator 10, respectively.

Figure 3:
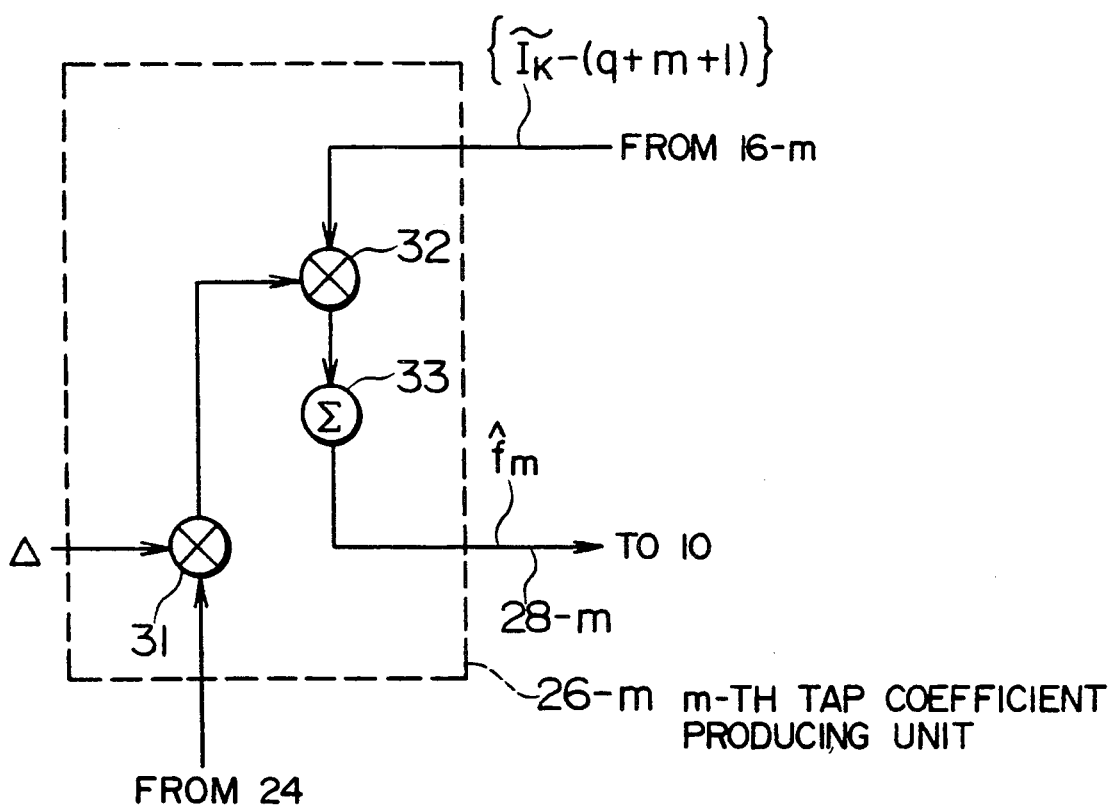
FIG. 3 shows a block diagram of a tap coefficient producer for use in the channel impulse response estimator illustrated in FIG. 2.

Turning to FIG. 3, the tap coefficient producer 26 comprises zeroth through M-th tap coefficient producing units which are similar in structure to one another. Therefore, an m-th tap coefficient producing unit 26-m is shown in FIG. 3 alone. The m-th tap coefficient producing unit 26-m comprises a primary multiplying unit 31, a secondary multiplying unit 32, and an accumulator 33. The primary multiplying unit 31 is supplied with the difference signal and the fixed step-size signal. The primary multiplying unit 31 multiplies the difference signal and the fixed step-size signal to produce a primary multiplied signal. The primary multiplied signal is supplied to the secondary multiplying unit 32 which is supplied with the m-th delayed sequence signal $\{I_{k-(q+m+1)}\}$ from the m-th register 16-m. The secondary multiplying unit 32 multiplies the primary multiplied signal and the m-th delayed sequence signal $\{I_{k-(q+m+1)}\}$ to produce a secondary multiplied signal. The secondary multiplied signal is supplied to the accumulator 33. The accumulator 33 accumulates the secondary multiplied signal to produce an accumulated signal as the m-th tap coefficient signal $f_m$. It will be assumed that a k-th time k is prior to a (k+1)-th time (k+1) by a repetition period. According to the minimum square error algorithm, the m-th tap coefficient signal $f_{m,k+1}$ at the (k+1)-th time (k+1) is represented by:

$$f_{m,k+1} = f_{m,k} + \Delta e_k II_{m,k}^*,$$

where $f_{m,k}$ represents the m-th tap coefficient signal at the k-th time k, $e_k$ represents the difference signal at the k-th time k, $II_{m,k}$ represents the m-th delayed sequence signal $\{I_{k-(q+m+1)}\}$ at the k-th time k, and * represents a complex conjugate.

As mentioned before, the conventional channel impulse response estimator 12' includes the tap coefficient producer 26 for producing the zeroth through the M-th tap coefficient signals on the basis of the fixed step-size signal indicative of the fixed step size $\Delta$. It is possible to make the adaptive maximum likelihood sequence estimation receiver including the conventional channel impulse response estimator 12' respond to a channel characteristic with fluctuation by controlling the zeroth through the M-th tap coefficient signals. As well known in the art, the larger the step size $\Delta$ is, the faster the response time becomes but noise tolerance is degraded. On the other hand, the smaller the step size $\Delta$ is, the higher noise tolerance becomes but the response time is degraded. Accordingly, the adaptive maximum likelihood sequence estimation receiver including the conventional channel impulse response estimator 12' is disadvantageous in that it is difficult to apply to a communication system such as a digital mobile communication system having the channel characteristic which rapidly fluctuates, as mentioned in the preamble of the instant specification.

Figure 4:
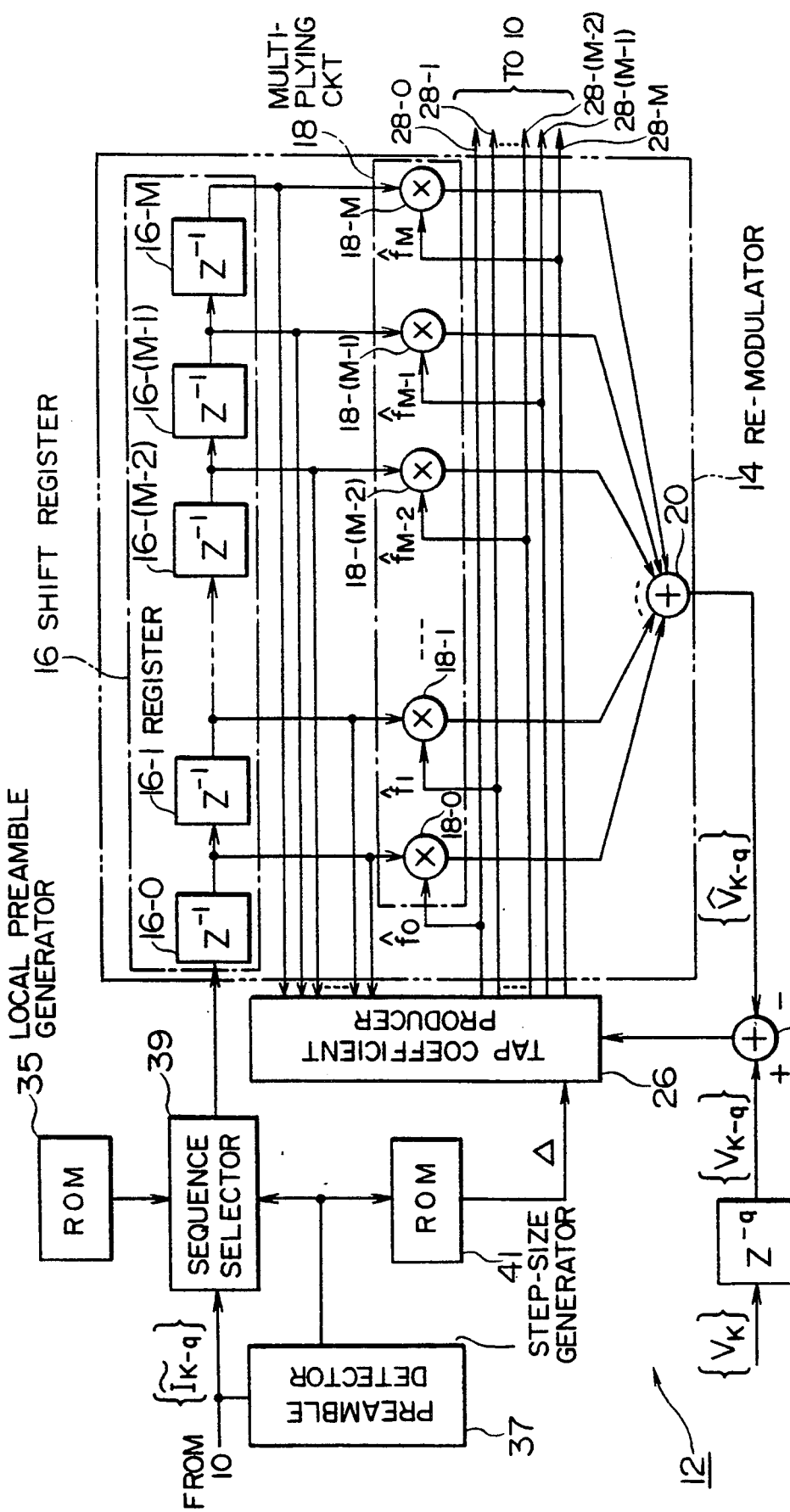
FIG. 4 shows a block diagram of a channel impulse response estimator according to a preferred embodiment of this invention.

Referring to FIG. 4, a channel impulse response estimator 12 according to a preferred embodiment of this invention is similar in structure to that illustrated in FIG. 2 except that the channel impulse response estimator 12 comprises a local preamble generator 35, a preamble detector 37, a sequence selector 39, and a step-size generator 41.

The local preamble generator 35 generates a local preamble signal indicative of a local preamble which is identical with the transmission preamble. In the example being illustrated, the local preamble generator 35 is implemented by a read-only memory (ROM) for preliminarily memorizing the local preamble. The preamble detector 37 is connected to the maximum likelihood sequence estimator 10 (FIG. 1). The preamble detector 37 detects the transmission preamble signal in the estimated sequence signal $\{I_{k-q}\}$ to produce a preamble detection signal on detection of the transmission preamble signal.

The sequence selector 39 is connected to the maximum likelihood sequence estimator 10 (FIG. 1), the local preamble generator 35, and the preamble detector 37. Responsive to the preamble detection signal, the sequence selector 39 selects one of the local preamble signal and the estimated sequence signal as a selected sequence signal. More particularly, the sequence selector 39 selects the local preamble signal as the selected sequence signal on presence of the preamble detection signal. The sequence selector 39 selects the estimated sequence signal $\{I_{k-q}\}$ as the selected sequence signal on absence of the preamble detection signal. The selected sequence signal is supplied to the re-modulator 14 as a substitute for the estimated sequence signal $\{I_{k-q}\}$.

The step-size generator 41 is connected to the preamble detector 37 and the tap coefficient producer 26. Responsive to the preamble detection signal, the step-size generator 41 generates one of first and second step-size signals as a selected step-size signal. More specifically, the first step-size signal indicates a first step size larger than a second step size indicated by the second step-size signal. The step-size generator 41 generates the first step-size signal as the selected step-size signal on presence of the preamble detection signal. On the other hand, the step-size generator 41 generates the second step-size signal as the selected step-size signal on absence of the preamble detection signal. In the example being illustrated, the step-size generator 41 is implemented by another read-only memory (ROM) for preliminarily memorizing the first and the second step sizes. The selected step-size signal is supplied to the tap coefficient producer 26 in place of the fixed step-size signal.

With this structure, it is possible to speed up the response time for the impulse response signals on reception of the transmission preamble signal in the received signal. This is because the re-modulator 14 produces the replica signal by using the local preamble signal and the tap coefficient producer 26 produces the zeroth through the M-th tap coefficient signals $f_0$ to $f_M$ on the basis of the first step-size signal having the first step size larger than the second step size of the second step-size signal when the preamble detector 37 detects the transmission preamble signal in the estimated sequence signal $\{I_{k-q}\}$. Accordingly, the adaptive maximum likelihood sequence estimation receiver including the channel impulse response estimator 12 can apply to a communication system such as a digital mobile communication system having the channel characteristic which rapidly fluctuates.

What is claimed is:

1. A channel impulse response estimator for use in an adaptive maximum likelihood sequence estimation receiver comprising a maximum likelihood sequence estimator for carrying out a sequence estimation operation on a received signal in response to a plurality of impulse response signals which collectively indicate a channel impulse response to produce an estimated sequence signal indicative of an estimated sequence after a lapse of a predetermined delay time, said received signal comprises a transmission preamble signal indicative of a transmission preamble and a data signal following said transmission preamble signal, said channel impulse response estimator being for carrying out a response estimation operation on said received signal and said estimated sequence signal to produce said impulse response signals, wherein the improvement comprises:

a local preamble generator for generating a local preamble signal indicative of a local preamble which is identical with said transmission preamble;

a preamble detector connected to said maximum likelihood sequence estimator for detecting said transmission preamble signal in the estimated sequence signal to produce a preamble detection signal on detection of said transmission preamble signal;

a sequence selector connected to said maximum likelihood sequence estimator, said local preamble generator, and said preamble detector for selecting, in response to said preamble detection signal, one of said local preamble signal and said estimated sequence signal as a selected sequence signal, said sequence selector selecting said local preamble signal as said selected sequence signal on presence of said preamble detection signal, said sequence selector selecting said estimated sequence signal as said selected sequence signal on absence of said preamble detection signal;

a step-size generator connected to said preamble detector for generating, in response to said preamble detection signal, one of first and second step-size signals as a selected step-size signal, the first step-size signal indicating a first step size larger than a second step size indicated by the second step-size signal, said step-size generator generating said first step-size signal as said selected step-size signal on presence of said preamble detection signal, said step-size generator generating said second step-size signal as said selected step-size signal on absence of said preamble detection signal;

a re-modulator connected to said sequence selector for carrying out a re-modulation operation on said selected sequence signal on the basis of a plurality of tap coefficients to produce a replica signal indicative of a replica of said received signal and a plurality of delayed sequence signals into which said selected sequence signal is delayed;

a delay circuit supplied with said received signal for delaying said received signal for said predetermined delay time to produce a delayed received signal;

a difference calculating circuit connected to said delay circuit and said re-modulator for calculating a difference between said delayed received signal and said replica signal to produce a difference signal indicative of said difference;

a tap coefficient producer connected to said difference calculating circuit, said step-size generator, and said re-modulator for producing a plurality of tap coefficient signals indicative of said tap coefficients on the basis of said difference signal, said selected step-size signal, and said delayed sequence signals; and supplying means connected to said tap coefficient producer and said maximum likelihood sequence estimator for supplying said tap coefficient signals as said impulse response signals to said maximum likelihood sequence estimator.

2. A channel impulse response estimator as claimed in claim 1, wherein said re-modulator comprises:

a shift register connected to said sequence selector for carrying out a shifting operation on said selected sequence signal to produce a plurality of shifted sequence signals as said delayed sequence signals;

a multiplying circuit connected to said shift register and said tap coefficient producer for multiplying said shifted sequence signals by said tap coefficient signals to produce a plurality of multiplied signals; and a summing circuit connected to said multiplying circuit for summing up said multiplied signals to produce a summed signal as said replica signal.

3. A channel impulse response estimator as claimed in claim 1, wherein said local preamble generator is implemented by a read-only memory for preliminarily memorizing said local preamble.

4. A channel impulse response estimator as claimed in claim 1, wherein said step-size generator is implemented by a read-only memory for preliminarily memorizing the first and second step-sizes.

* * * * *

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 3, line 48, delete "$f_0, f_1, ..., f_{M-2}, f_{M-1}$, and $f_M$", insert --$\hat{f}_0, \hat{f}_1, ..., \hat{f}_{M-2}, \hat{f}_{M-1}$, and $\hat{f}_M$--, Col. 3, line 50, delete "$I_{k-q}$" insert --$\tilde{I}_{k-q}$--, Col. 3, line 59, delete "$I_{k-q}$" insert --$\tilde{I}_{k-q}$--, Col. 3, line 60, delete "$f_0$ to $f_M$" insert --$\hat{f}_0$ to $\hat{f}_M$--, Col. 3, line 65, delete "$I_{k-q}$" insert --$\tilde{I}_{k-q}$--,

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 3, line 68, delete "$I_{k-q}$" insert --$\tilde{I}_{k-q}$--,

Col. 4, line 2, delete "$V_{k-q}$" insert --$\tilde{V}_{k-q}$--,

Col. 4, line 4, delete both occurrences of "$I_k$" insert --$\tilde{I}_k$--,

Col. 4, line 5, delete "$I_{k-q}$" insert --$\tilde{I}_{k-q}$--,

Col. 4, line 8, delete "$I_{k-q}$" insert --$\tilde{I}_{k-q}$--,

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 4, line 9, delete "$I_{k-q}$" insert --$\tilde{I}_{k-q}$--,

Col. 4, line 12, delete both occurrences of "$I_k$" insert --$\tilde{I}_k$-- for both, Col. 4, line 17, delete both occurrences of "$I_k$" insert --$\tilde{I}_k$-- for both, Col. 4, line 20, delete both occurrences of "$I_k$" insert --$\tilde{I}_k$-- for both, Col. 4, lines 22 & 23, delete "$f_0, f_1, ..., f_{M-2}, f_{M-1}$ and $f_M$" insert --$\hat{f}_0, \hat{f}_1, ..., \hat{f}_{M-2}, \hat{f}_{M-1}$ and $\hat{f}_M$--,

UNITED STATES PATENT AND TRADEMARK OFFICE
CERTIFICATE OF CORRECTION

Page 4 of 9

PATENT NO. : 5,359,628
DATED : October 25, 1994
INVENTOR(S) : Muto

It is certified that error appears in the above-indentified patent and that said Letters Patent is hereby corrected as shown below:

Col. 4, line 26, delete both occurrences of "$I_k$" insert --$\tilde{I}_k$--,

Col. 4, line 27, delete "$f_o$" to --$f_M$-- insert --$\hat{f}_o$ to $\hat{f}_M$--, Col. 4, line 32, delete "$I_k$" insert --$\tilde{I}_k$--, Col. 4, line 33, delete "$f_o$" insert --$\hat{f}_o$--, Col. 4, line 35, delete "$I_k$" insert --$\tilde{I}_k$--,

UNITED STATES PATENT AND TRADEMARK OFFICE
CERTIFICATE OF CORRECTION

Page 5 of 9

PATENT NO. : 5,359,628
DATED : October 25, 1994
INVENTOR(S) : Muto

It is certified that error appears in the above-indentified patent and that said Letters Patent is hereby corrected as shown below:

Col. 4, line 36, delete "$f_1$" insert --$\tilde{f}_1$--,

Col. 4, line 38, delete "$I_k$" insert --$\tilde{I}_k$--,

Col. 4, line 39, delete "$f_m$" insert --$\hat{f}_m$--,

Col. 4, line 46, delete "$V_{k-q}$" insert --$\hat{V}_{k-q}$--,

Col. 4, line 54, delete "$V_{k-q}$" insert --$\hat{V}_{k-q}$--,

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 4, line 58, delete "$V_{k-q}$" insert --$\hat{V}_{k-q}$--,

Col. 4, line 65, delete "$\hat{f}_0$" to $\hat{f}_M$-- insert --$\hat{f}_0$ to $\hat{f}_M$--, Col. 5, line 1, delete both occurrences of "$I_k$" insert --$\tilde{I}_k$-- for both, Col. 5, line 3, delete "$f_0$ to $f_M$" insert --$\hat{f}_0$ to $\hat{f}_M$--, Col. 5, line 10, delete "$f_0$ to $f_M$" insert --$\hat{f}_0$ to $\hat{f}_M$--,

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 5, line 17, delete "$f_o$ to $f_m$" insert --$\hat{f}_o$ to --$\hat{f}_M$--, Col. 5, line 34, delete "$I_k$" insert --$\tilde{I}_k$--, Col. 5, line 36, delete "$I_k$" insert --$\tilde{I}_k$--, Col. 5, line 41, delete "$f_m$" insert --$\hat{f}_m$--, Col. 5, line 44, delete "$f_m$" insert --$\hat{f}_m$--,

UNITED STATES PATENT AND TRADEMARK OFFICE
CERTIFICATE OF CORRECTION

PATENT NO. : 5,359,628
DATED : October 25, 1994
INVENTOR(S) : Muto

It is certified that error appears in the above-indentified patent and that said Letters Patent is hereby corrected as shown below:

Col. 5, line 47, delete "$f_{m,k+1} = f_{m,k} + \Delta \epsilon k \Pi_{m,k}$", insert --$\hat{f}_{m,k+1} = \hat{f}_{m,k} + \Delta \epsilon k \tilde{\Pi}_{m,k}$--, Col. 5, line 49, delete "$f_{m,k}$" insert --$\hat{f}_{m,k}$--, Col. 5, line 51, delete "$k, \Pi_{m,k}$" insert --$k, \tilde{\Pi}_{m,k}$--, Col. 5, line 52, delete "$I_k$" insert --$\tilde{I}_k$--, Col. 6, line 24, delete "$I_{k-q}$" insert --$\tilde{I}_{k-q}$--,

UNITED STATES PATENT AND TRADEMARK OFFICE
CERTIFICATE OF CORRECTION

Page 9 of 9

PATENT NO. : 5,359,628
DATED : October 25, 1994
INVENTOR(S) : Muto

It is certified that error appears in the above-indentified patent and that said Letters Patent is hereby corrected as shown below:

Col. 6, line 37, delete "$I_{k-q}$" insert --$\tilde{I}_{k-q}$--,

Col. 6, line 40, delete "$I_{k-q}$" insert --$\tilde{I}_{k-q}$--,

Col. 6, line 67, delete "$f_0$ to $f_M$" insert --$\hat{f}_0$ to $\hat{f}_M$--,

Col. 7, line 3, delete "$I_{k-q}$" insert --$\tilde{I}_{k-q}$--.

Signed and Sealed this

Thirtieth Day of May, 1995

*Attest:*

BRUCE LEHMAN

*Attesting Officer*     *Commissioner of Patents and Trademarks*